United States Patent [19]

Reddy et al.

[11] 3,857,197

[45] Dec. 31, 1974

[54] DOOR OPERATOR WITH DOOR PANEL POSITION SENSING AND LOCKING DEVICE

[75] Inventors: Redreddy Sukumar Reddy, Chicago; Carl W. Roth, Arlington Hts.; Richard A. Rago, Elmhurst; Kristupas Daugirdas, Wilmette, all of Ill.

[73] Assignee: Vapor Corporation, Chicago, Ill.

[22] Filed: Nov. 9, 1972

[21] Appl. No.: 304,907

[52] U.S. Cl.......................... 49/13, 49/280, 49/349, 49/360
[51] Int. Cl......... 105 341, E05b 47/00, E05f 15/14
[58] Field of Search............... 49/13, 14, 28, 29, 30, 49/139, 280, 349, 360; 105/341–343

[56] References Cited
UNITED STATES PATENTS
3,429,073  2/1969  Tucker................................ 49/13 X
3,537,403  11/1970  Daugirdas et al................... 105/341

Primary Examiner—J. Kapl Bell
Attorney, Agent, or Firm—Lloyd L. Zickert

[57] ABSTRACT

Door operator for a transit vehicle including a primary linkage device for driving the door between open and closed positions and for monitoring door position and a secondary linkage device for monitoring door position. Additionally, a device is provided for locking the door in closed position in association with the secondary linkage device.

16 Claims, 6 Drawing Figures

PATENTED DEC 31 1974 3,857,197

SWITCH SEQUENCE TABLE

FIG. 6

DOOR OPERATOR WITH DOOR PANEL POSITION SENSING AND LOCKING DEVICE

This invention relates in general to a door operator for a rapid transit vehicle such as a railroad vehicle that provides mass transportation of passengers wherein the door operator is adapted to drive a door or door panel between open and closed positions to permit ingress and egress of passengers from the vehicle, and more particularly to an electric door operator constructed to be mounted in the side wall of a vehicle adjacent to a door opening and above the floor of the vehicle which includes a seconary linkage arrangement for sensing the door position independent of the primary driving linkage, thereby increasing the safety for passengers using the vehicle.

The door operator of the invention is of a type that is adapted to be mounted in the side wall of a vehicle adjacent to a door opening and above the floor of the passenger compartment to drive a sliding door between open and closed position. Accordingly, the door operator is essentially in line with the door which slides between open and closed positions relative to the door opening. Heretofore, door operators of this general type have been known and are disclosed in U.S. Pat. No. 3,537,403. While the door operator disclosed in the patent does disclose, in association with the driving linkage for driving the door between open and closed positions, means for sensing the door position to operate an interlock traction circuit, it does not disclose or teach the features of the present invention which include providing a secondary device for sensing door position independent of the primary driving linkage so that in event of primary driving linkage failure, the door position will be monitored, thereby enhancing the safety of passengers.

The door operator of the present invention, like that disclosed in the aforesaid patent, is arranged in a compact package mountable within the side wall of a vehicle adjacent the door opening, whereby it is readily accessible for maintenance and/or exchangeability. The usual railway transit car is defined by a body having a floor, side and end walls, and a ceiling. Door openings are provided in the side walls and normally the doors for the door openings are slidably mounted to move into the door openings from pockets formed in a side wall of a car adjacent to the opening. A pocket extension is provided for receiving the door operator of the present invention, which extension is directly adjacent and in communication with the door pocket that the door moves into when it moves into open position. An access door is preferably provided on the inner wall of the transit car for permitting accessiblity to the door operator for maintenance purposes. It can be appreciated that the door operator is mounted well above the floor and generally in the central area between the top and bottom edges of the side wall.

The door operator of the present invention includes a mounting plate or base plate for its components which extends within the side wall of the car in a generally upright position and which can be removed for ease of exchangeability. Accordingly, the mounting plate is generally arranged along the vertical axis and therefore the door operator is essentially vertically oriented and has a depth no greater than the distance between the inner and outer panels of the side wall. A vertically positioned reversible motor is mounted on the mounting plate and connected to and drives a gear box having an output shaft extending substantially transverse to the mounting plate and the side wall of the vehicle. An extension arm is pivotally mounted on one end at the mounting plate and has pivotally connected to its outer end a connecting rod which is in turn pivotally connected to the trailing edge of the door. Suitable driving linkage means are provided between the output shaft of the gear box and the extension arm, which is generally the same as in the aforesaid patent and which moves to an overcenter locking position when the door is fully closed. Cams are carried by the extension arm for actuating switches controlling the operation of the door operator. Additionally, the linkage means between the extension arm and the output shaft of the gear box actuates switch means for assisting in the operation of the door operator. One of the switch means in the form of an interlock limit switch is incorporated in the traction interlock circuit and closes the circuit when the door operator moves to overcenter locked position consistent with the closed position of the door. Closing of the interlock traction circuit permits actuation of the traction motors for driving the vehicle. Accordingly, for the safety of the passengers, unless the overcenter locked position of the driving linkage is sensed which indicates the door is in fully closed position (assuming the driving linkage is properly operating and connected to the door), the traction motors of the vehicle cannot be energized and the vehicle cannot move.

A secondary linkage is also provided for monitoring door position which includes an extension arm pivotally mounted at the mounting plate of the door operator at one end and pivotally connected at its other end to a connecting rod which is in turn pivotally connected to the trailing edge of the door. The secondary linkage is driven by the door and is in that respect passive. Cam means on the extension arm actuates an interlock limit switch which is in series with the interlock limit switch of the primary linkage means, and therefore in the event that the door is not in closed position, even though the primary driving linkage means has failed and its interlock limit switch is closed, the traction interlock circuit is open and the traction motors cannot be energized. Therefore, this redundancy constitutes a passenger safety feature in the event that the primary linkage would fail and would indicate the door is in closed position. Further, a lost motion or hysterisis effect means is incorporated in the secondary linkage means to prevent closure of the interlock limit switch in the event the door is pushed back prior to moving to fully closed position, and to prevent opening of the switch after the door has been closed unless movement beyond a given distance is sensed. Therefore, to complete the interlock circuit, both the door panel must be fully closed and the operator linkage must be locked overcenter. Also associated with the secondary linkage is a locking device for locking the door in closed position. Heretofore, such locking devices were outside of the door operator package, but the present invention contemplates bringing this locking device into the door operator package to eliminate the need of otherwise providing a door locking device.

A further feature of the present invention is a resilient linkage arrangement in the extension arm of the primary linkage means wherein the door may be pushed back a controlled distance against a spring pressure when the door is either almost fully closed or has already locked to thereby allow removal of a purse, or arm or a foot, clothing or other object, and prevent a possible injury. In the event the door has been moved to closed position and thereafter pushed back no more than a given distance, because of the previously mentioned lost motion means, the interlock limit switches will not open and the interlock circuit will not be interrupted.

In the operator control circuit, a second lock relay is provided as part of a dual trainline control, thereby requiring the presence of two signals before an operator will open a door. This prevents opening the door unexpectedly by a stray signal, thereby further enhancing passenger safety. In the event of an overload, the operator motor is automatically operated at a reduced safe current by employing an overload device bypass resistor in the control circuit. This minimizes train delays that would otherwise result where it would be necessary to reset the overload device. The control circuit includes the normal on-off toggle switch which is operable to remove the operator from the train line with an added position that enables conditioning the control circuit to test closing action of the door operator to facilitate ease of maintenance and service work. Additionally, signal lights are provided to indicate when the primary linkage is not in overcenter locked position, and/or when the secondary linkage does not sense the door in closed position.

It is therefore an object of the present invention to provide a new and improved door operator which greatly enhances passenger safety in transit vehicles.

Another object of this invention is to provide a door operator having a secondary linkage driven by the door to sense door position independent of means on the operator driving linkage which senses overcenter locked position.

Still another object of the invention is in the provision of a new and improved door operator which includes a self-contained manually operable locking mechanism for locking the door in closed position and for bypassing the interlock circuit to permit continued operation of the vehicle.

A further object of this invention is in the provision of a resilient linkage feature incorporated in the primary operator driving linkage to permit pushback of the door panel a controlled distance when the door is either almost fully closed or has already locked in closed position, thereby allowing removal of objects caught by the leading edge of the door and preventing a possible injury.

A still further object of this invention is to provide a secondary linkage for a door operator which is driven by the door panel and which senses the door position and interrupts an interlock circuit for the traction power when the door is not in fully closed position, whereby following the closing of the door and completion of the interlock circuit, the door may be pushed back a controlled distance without interrupting traction power.

A still further object of this invention is in the provision of a control circuit for a door operator that includes a thermal overload arrangement which, when triggered by a stalled motor condition, will interrupt full operator power and prevent motor damage but still permit unit operation with reduced speed so as to reduce train delays.

Another object of this invention resides in the provision of a control circuit for a door operator requiring two separate signals to energize the operator for the opening cycle, thereby preventing a stray signal to the operator from the opening the door unexpectedly and thereby causing a safety hazard to be present for vehicle passengers.

Still another object of this invention is to provide means in an operator control circuit for conditioning a signal light to indicate the failure of an operator to close the door panel or to lock, thereby permitting rapid identification of a problem unit and reducing train delay.

Other objects, features and advantages of the invention will be apparent from the following detailed disclosure, taken in conjunction with the accompanying sheets of drawings, wherein like reference numerals refer to like parts, in which:

Figure 1:
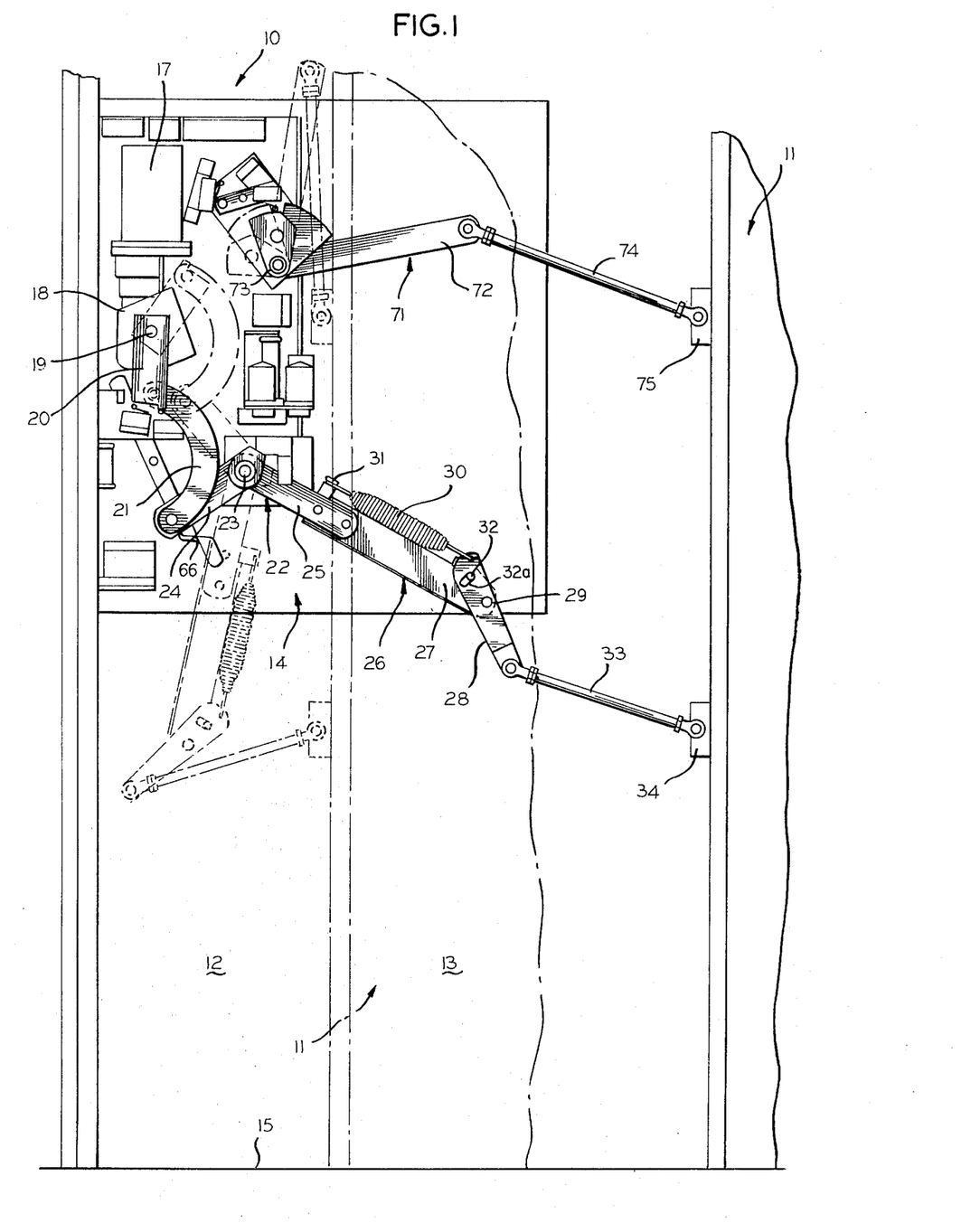
FIG. 1 is an inside elevational view of a door operator according to the invention shown in connection with a fragmentary door panel and as mounted in the side wall of a vehicle.

Referring now to the drawings and particularly to FIG. 1, the door operator of the invention, generally indicated by the numeral 10, is illustrated as it would be mounted in a side wall of a vehicle for opening and closing a door panel 11 that would be associated with a suitable door opening in the vehicle. The parts shown in solid lines illustrate the door operator parts positioned with the door 11 in closed position, while the door and operator parts illustrated in phantom show the door open position. It will be understood that the door operator 10 will be vertically oriented within the side wall and mounted between the inner and outer panels defining the side wall in an extension 12 of a door pocket 13 so that it is aligned with the door pocket and door. The inner panel of the side wall would be provided with a suitable access cover to allow access to the operator for maintenance and service and/or removal of the operator for exchangeability. To further enhance exchangeability and maintenance, the components of the door operator are mounted on a mounting plate or baseplate 12, which is in turn suitably secured to the structure of the vehicle within the side wall, wherein the entire operator may be removed by merely disengaging the baseplate from the vehicle structure and disconnecting mechanical and electrical connections.

It should be understood that the door operator of the invention is essentially useful for driving a single door panel between open and closed positions although it can be suitably modified for driving a pair of door panels. It should be further understood that the operator, when used for driving a single door panel, would normally do so in connection with a biparting door panel arrangement wherein a second operator would be used for driving the other door panel, the two door panels being used to open or close a single door opening.

The door operator 10 is illustrated in FIG. 1 as mounted above the floor line 15 and vertically arranged for ease of service and maintenance. The components of the door operator are arranged on the mounting plate or baseplate 14. Accordingly, all of the components of the door operator are mounted on a steel baseplate assembly of either right or left hand configuration for operating a right or left hand door. The components include a vertically oriented reversible motor 17 driving a gear box 18, having a horizontally extending output shaft 19. The gear box output drives a series of linkage components ending in a multiplying lever to which is attached an extension arm that drives the door panel through a connecting rod. The drive arm 20 is secured to the output shaft 19 and driven thereby through a path of about 150° as it moves the door between open and closed positions. A crescent shaped or arcuate connecting link 21 is pivotally connected at one end to the outer end of the drive arm 20 and pivotally connected at the other end to the multiplying lever 22. The multiplying lever 22 is pivotally mounted on a stub shaft 23 fixed to the baseplate 14. Further, the multiplying lever 22 includes a first arm 24 extending from a hub portion carried on the stub shaft 23 and connected pivotally at its outer end to the lower end of the connecting link 21. A second arm 25 extends from the hub of the multiplying lever and is in turn connected to an extension arm 26.

In order to provide resiliency and a "pushback" feature in the operator linkage, the extension arm 26 includes a fixed arm portion 27 connected directly to the free end of the second arm 25 of the multiplying lever and also extending longitudinally therefrom and a movable arm 28 which is pivotally mounted on the fixed arm 27 at pin 29 intermediate its ends. Restraining the movable arm 28 to a normal position as shown in FIG. 1 is an extension spring 30 connected at one end to a lug 31 on the fixed arm 27 and at the other end to the inner end of the movable arm 28. A limit pin 32 extends laterally from the fixed arm 27 and is received in a slot 32a formed in the movable arm 28 wherein the movable arm 28 can pivot on the fixed arm 27 within the confines of the slot 32a as it bottoms at opposite ends on the pin 32. The other free end of the movable arm 28 is connected to one end of a connecting rod 33, the other end of which is connected to a bracket 34 mounted on the trailing edge of the door panel 11. Accordingly, the output shaft 19 of the gear box is connected to the door panel 11 through the series of linkage members ending in a multiplying lever, a resilient extension arm 26 and a connecting rod 33. Rotation of the output shaft 19 in a counterclockwise direction causes swinging of the drive arm to the position shown in phantom and likewise movement of the other linkage components and the door panel to the positions shown in phantom, which represents open position. The door and components shown in solid lines represent closed position. The resilient extension arm 26 provides a pushback feature to the door which permits pushback of the door panel during the closing cycle or in the event that an object is caught at the leading edge of the door when in closed position, thereby enhancing passenger safety. For example, if a part of a person's clothing, his hand, foot or other part of his body, is caught by the leading edge of the door or in connection with the leading edge of the door engaging the leading edge of another door or an'edge of an opening, the pushback feature will allow slight pushback of the door to permit removal of the object and thereby decrease the chance of subjecting injury to the passenger.

Figure 4:
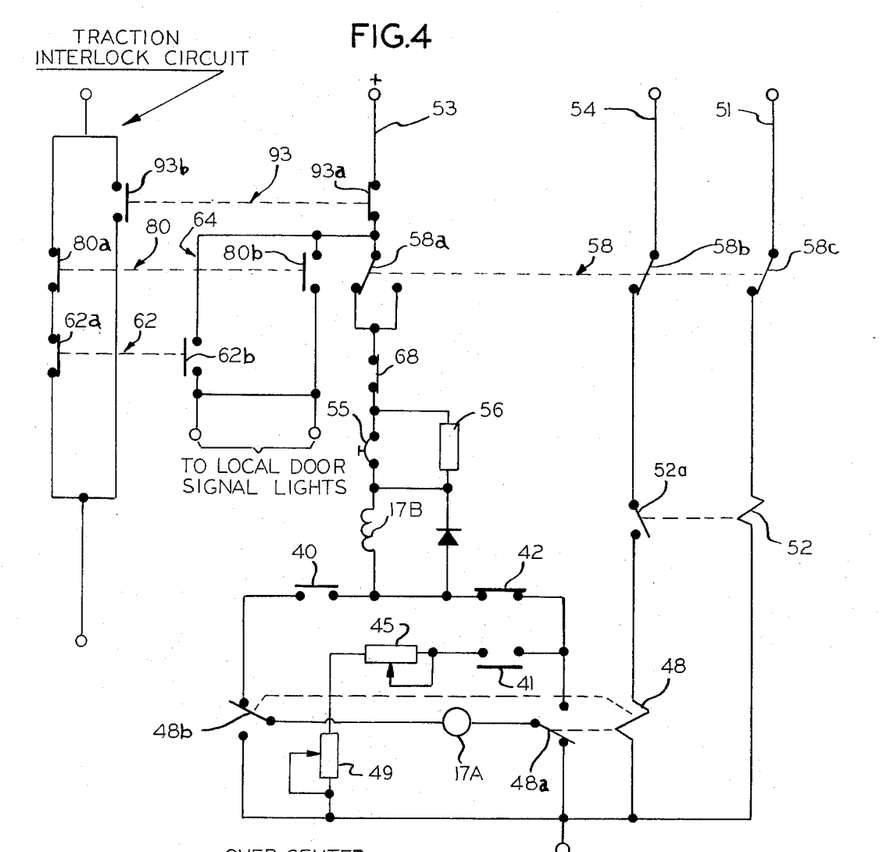
FIG. 4 is an electrical schematic diagram of the operator control circuit according to the invention.

In order to control the operation of the door operator, a motor control circuit is provided, as seen in FIG. 4, which includes a plurality of limit switches, relays and associated components capable of effecting proper door opening and closing cycles as controllable from the train line. Limit switches 40, 41 and 42 control the door movement and are actuated by motion of the unit linkage or cams affixed to members of the linkage during the opening and closing cycles. The limit switches 41 and 42 are respectively actuated by cams 43 and 44 which are individually adjustable to permit suitable control of heavier weight doors. These cams are adjustably secured to and movable with the multiplying lever 22. Cam 43 actuates switch 41 which adds a cushion resistor 45 to the control motor control circuit near the end of the opening cycle to reduce the speed of the operator, while cam 44 actuates limit switch 42 to open the motor control circuit and de-energize the motor as the door panel is about to reach its fully open position. Limit switch 40 is actuated during the closing cycle by the drive arm 20 to de-energize the motor circuit as the door panel reaches closed position and the linkage reaches overcenter locked position.

A motor control relay 48 having mechanically connected contact arms 48a and 48b controls the operator direction. When the motor control relay is energized, it will cause the motor control circuit to drive the motor 17 in a direction to drive the components and the door panel through the opening cycle. Likewise, when the motor control relay is de-energized, it will cause the motor control circuit to drive the motor 17 in the reverse direction to drive the components of the operator and the door panel through the closing cycle.

During the closing cycle a closing resistor 49 is in parallel with the armature 17A of the motor 17 to reduce the speed of the motor and the speed of closing. As already mentioned, the cushion resistor 45 is added to the control circuit and placed in parallel with the armature 17A when the limit switch 41 is closed during the opening cycle to reduce speed of the operator during the final portion of the opening cycle thereby preventing slamming of the door panel and operator components when they come to rest in the opening cycle end position. Both the opening cushioning resistor 45 and the closing cushion resistor 49 are adjustable to permit adjusting the opening cushion magnitude and the door closing speed.

It is necessary for dual signals to be presented to the operator before it will cause an opening cycle. First a signal must be presented to the lock line 51 which energizes a lock relay 52 to close contacts 52a in the door open train line 54. Then a signal on train line 54 will cause energization of the motor control relay to actuate the switch arms 48a and 48b into a position to cause the operator to move to the opening cycle. Normally, the signals will be impressed simultaneously on these lines. Thereafter, removal of the signals from the lock line and the door opening line, or either one of them, will cause the deenergization of the motor control relay and actuation of the switch arms 48a and 48b to cause the operator to go through the door closing cycle. Therefore, a stray signal to the operator on either of the lines 51 or 54 will not cause opening of the door panel or operation of the operator. This thereby increases passenger safety.

The power is applied to the armature 17A and the field 17B through the positive line 53 and the negative line 54. For purposes of simplicity, line 53 will be referred to as the power line. In the event of an overload of the operator motor, a thermal overload cutout 55 interrupts the main power line 53. However, the thermal cutout 55 is bypassed by an overload resistor 56 which is connected in parallel to the thermal overload cutout so that the motor may continue to operate at a safe, reduced current. This minimizes train delays which otherwise result if it was necessary to reset the thermal cutout before the operator could continue to operate.

As in heretofore known similar door operators, a service switch 58 is provided with a "normal" position as illustrated in FIG. 4 and includes a switch arm 58A in the power line 53, a switch arm 58B in the door open line 54, and a switch arm 58C in the lock line 51. The "normal" position permits the door operator to operate with the train lines. Additionally, the switch has a "cutout" position which allows complete removal of the door operator from the train lines circuit so that in the event of malfunction, the door operator can be removed from service without incapacitating the car system. Additionally, the service switch 58 includes a "test" position which is used to provide local door operation for ease of maintenance and service work and which when operated closes an opened door when held in the "test" position. Returning the switch to open position then reopens the door. The position is momentary to prevent unintentional leaving of the switch in this position. As seen in FIG. 4, this position will complete the power line circuit 53 while interrupting the door opening line 54 and the lock relay line 51 which in essence removes the signals from these lines so that the door operator will undergo its closing cycle.

When the door operator moves through the closing cycle, the pivot between the drive arm 20 and the arcuate connecting link 21 swings to an overcenter locking position with respect to the output shaft 19 of the gear box 18 and the pivot between arcuate arm 21 and first arm 24 of the multiplying lever 22. In the overcenter position the drive arm abuts against a stop 60 and thereby locks the door panel in closed position. As the drive arm moves into overcenter position, a lobe 61 on the other free end of the drive arm actuates a limit switch 62 to close contacts 62a of a traction motor interlock circuit 63 (see FIG. 4). Actuation of switch 62 additionally opens the switch contacts 62b to open a local door signal light circuit 64. During the opening cycle, the traction interlock circuit is opened, thereby preventing operation of the traction motors of the vehicle which prevents it from moving, and defines a safety feature to prevent accidental injury to passengers entering and leaving the vehicle. Further, the signal light circuit is closed, illuminating a signal light and indicating the operator is not locked overcenter. When the switch 62 is actuated by the primary driving linkage components, the linkage has reached overcenter locked position, at which point the door should be in closed position. Illumination of the individual local signal light for a given door assists in indicating to operating personnel whether a door operator is properly functioning. Preferably, the signal light is located at the outside wall of the car adjacent to the door.

In the event of an emergency, such as a power failure, and it is necessary to open the door, an emergency handle 66 pivoting on a pin 67 carried on the baseplate is manually actuated to engage the drive arm to drive it to unlocked position so that the door can be merely opened by applying pressure to the leading edge of the door. As the emergency handle 66 is moved, it actuates an emergency switch 68 which opens the power line 53 to prevent inadvertent operation of the motor.

Accordingly, the primary driving linkage which drives the door panel 11 between open and closed positions senses the position of the door panel by means of the switch 62 which is actuated to close the traction interlock circuit 63a when the driving linkage moves to overcenter locked position. Additionally, when the driving linkage is not in overcenter locked position, the switch 62 operates to close the indicating light circuit 64 to indicate that the door panel is either in open position or the primary driving linkage is not in overcenter locked position.

Figure 5:
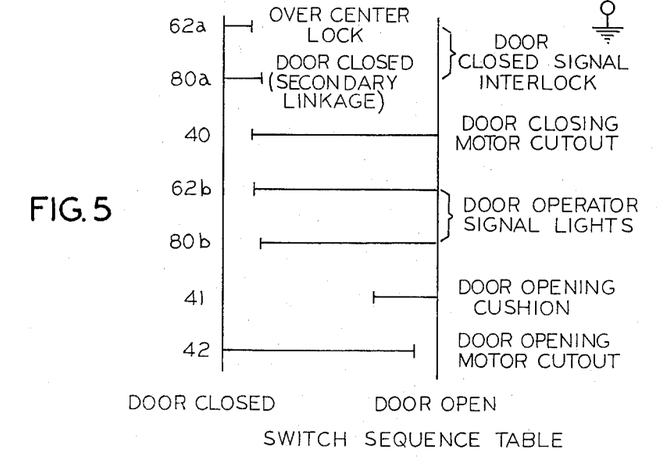
FIG. 5 is a sequence table illustrating the operation of the limit switches incorporated in the door operator control circuit.

The position of the door panel 11 is further monitored by a secondary linkage arrangement 17 which is driven by the door panel itself and therefore passive in nature and completely independent of the primary driving linkage. The secondary linkage arrangement includes an extension arm 72 pivotally mounted at one end to a pin or shaft 73 secured to the baseplate 14. The other end of arm 73 is pivotally connected to a connecting rod 74 which is in turn pivotally connected to a bracket 75 secured to the trailing edge of the door panel 11. Thus, the secondary linkage arrangement 71 is also connected to the door panel 11. However, unlike the primary driving linkage, it is driven by the door panel, but completely independent of the primary driving linkage which applies the opening and closing forces to the door panel. The secondary linkage arrangement acts as a follower linkage monitoring door panel position and transfering this information to the door operator through the actuation of a limit switch 80 which has interlock switch contacts 80a in traction circuit 63, and signal light switch contacts 80b in signal circuit 64. The switch 80 is actuated when a door reaches closed position as indicated by the secondary linkage arrangement and closes the contacts 80a to complete the traction interlock circuit 63 and to open the contacts 80b to de-energize the signal light circuit 64 and indicate that the door is in closed position. The operation of limit switches relative to door travel and position is illustrated in the sequence table of FIG. 5, wherein the solid lines indicate where the switch contacts are closed.

The secondary linkage arm 72 drives a cam 81 which has a lost motion connection relative the arm 72. A drive plate 82 is connected to and movable with the arm 72 and includes a pin 83 extending laterally therefrom into an opening 84 provided in the cam 81. Accordingly, when the door panel is moving to closed position, the arm 72 through the plate 82 and pin 83 pulls the cam 81 along. Additionally, the cam 81 is frictionally connected to the pin 73 so that in the event the arm 72 is pushed back after the doors are closed and locked and after the cam 81 has actuated the switch 80, the cam 81 will remain stationary until the pin 83 engages the back side of the hole 84, thereby allowing a certain distance pushback of the door or delay before the cam 81 actuates the switch 80. Further, during the closing cycle, whenever the door panel reverses direction, thereby reversing the rotation of the arm 72, the cam 81 delays or lags before it follows. This delay serves to accomplish two primary functions. If the operator primary driving linkage is pushed back after the doors are closed and locked, the hysterisis effect prevents interruption of the interlock traction circuit as occurs by deactuation of the switch 80. If, however, the door panel should be moved beyond a predetermined limit of approximately 1½ inches or any given distance, the cam 81 will be moved by the arm motion through the pin 83, deactuate the traction interlock circuit to prevent operation of the traction motors and also close the signal light circuit 64 to illuminate the signal light to indicate that the door is not in fully locked position. Secondly, hysterisis occurring during the closing cycle of the door wherein the motion of the cam 81 lags insures that the switch 80 will not be actuated to close the traction interlock circuit until the door reaches the near full closed position. Therefore, an early signal will not result. As seen in FIG. 4, the traction switch contact 62a of the primary driving linkage and the traction interlock switch contacts 80a of the secondary linkage are in series. Therefore, in order to complete the traction interlock circuit, both the door panel must be fully closed as monitored by the secondary linkage 71 and the operator linkage must be locked overcenter.

Figures 2, 3:
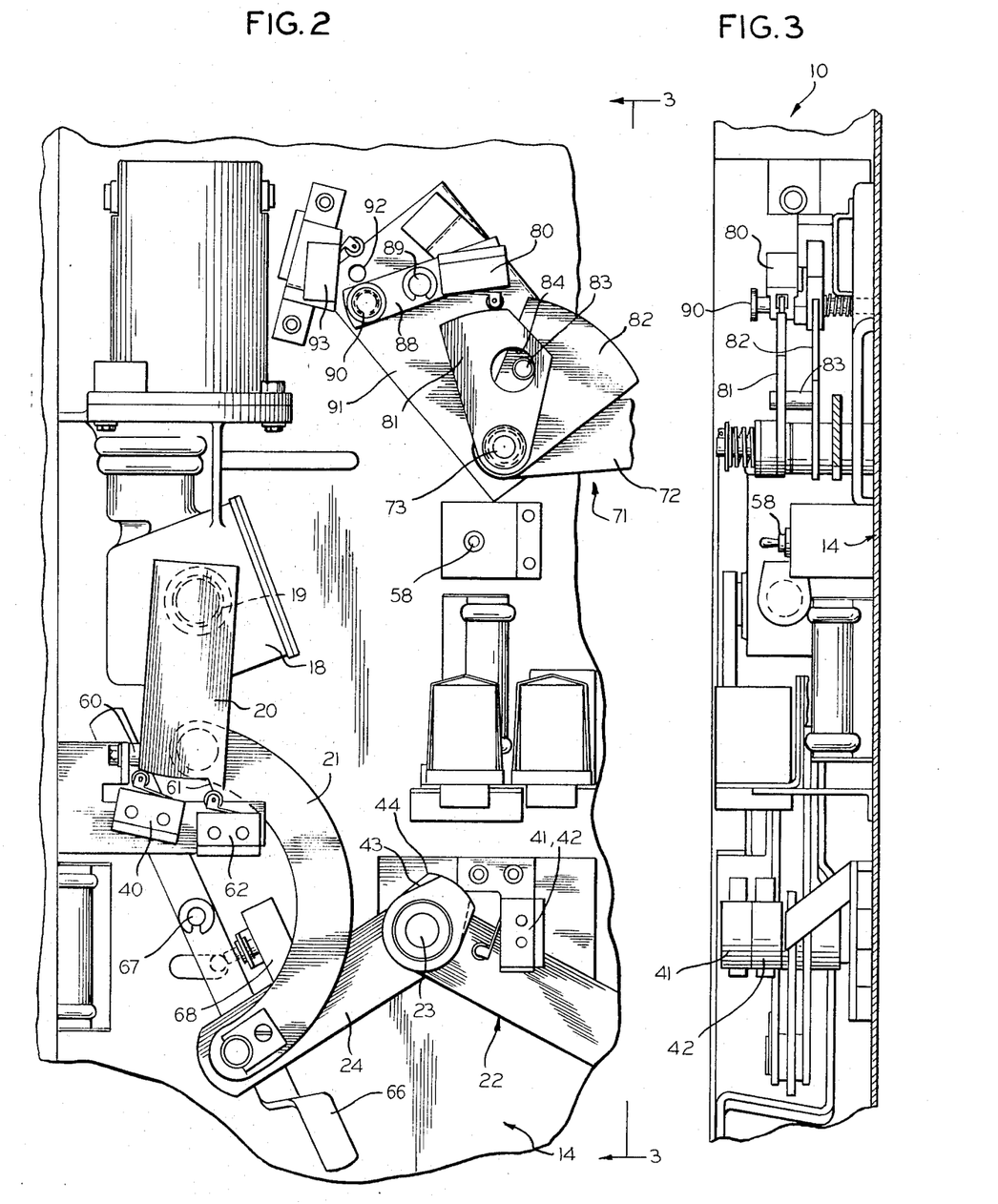
FIG. 2 is a greatly enlarged and detailed elevational view of the door operator of FIG. 1 with some parts broken away for purposes of clarity.
FIG. 3 is an end elevational view of the door operator of FIG. 2 looking in the direction of the arrows 3—3 of FIG. 2.

An additional feature for securing the door panel in locked position is also provided in connection with the secondary linkage arrangement. A mechanical lock pawl 88 pivotally mounted intermediate its ends on a pin 89 includes a spring pressed detent pin 90 at one end which positively locks in one of two holes formed in the plate 91 mounted directly on the baseplate 14. The lock pawl as illustrated in FIG. 2 is shown in unlocked position so that the linkage arrangement can operate in a normal manner whereby the door may be opened and closed. This mechanical locking device replaces an individual mechanical device usually mounted at the door opening. When moved to locked position, the detent pin 90 engages in the hole 92, thereby swinging the pawl 88 about the pivot 89 until the end adjacent the detent pin 90 engages and actuates a door lock switch 93 which opens contacts 93a to interrupt the power line 53 and prevent operation of the door operator and closes contacts 93b to close the traction interlock circuit 63 and allow operation of the train. The end of the pawl 88 opposite the end of the detent pin 90 swings into locking position with respect to the drive plate 82 to prevent it from moving in a counterclockwise direction and allowing opening of the door panel. And inasmuch as the door lock switch 93 is actuated by the pawl to interrupt the power to the operator motor and to bypass the traction interlock circuit, continued operation of the car system is permitted less the functioning of the locked out operator. The shape of the spring loaded detenting pin 90 is such as to prevent actuation of the door lock switch 93 unless positive detenting occurs.

Figure 6:
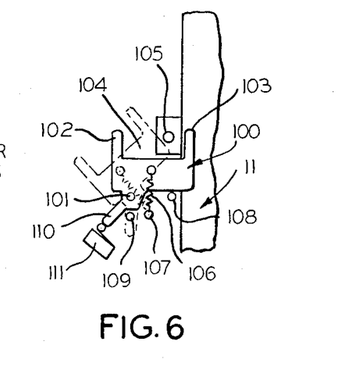
FIG. 6 is a somewhat diagrammatic view of a modified door position sensing device according to the invention.

A modified door position sensing device actuable independent of the primary driving linkage and effectively functioning as a secondary linkage arrangement for monitoring door position is illustrated in FIG. 6. This door monitoring device includes a generally U-shaped plate or member 100 pivotally mounted on a shaft 101 and movable between the positions shown in solid lines and the positions shown in dotted lines by the action of the door 11. The plate 100 includes upstanding and spaced arms 102 and 103 defining therebetween a slot 104 in which a door pin 105 secured to the trailing edge of the door is contained when the member 100 is in the position shown in solid lines. A spring 106 is attached at one end to the U-shaped plate 100 and at the other end to a stationary pin 107 such that the spring is in overcenter relation with respect to the shaft 101 when the plate 100 is in its door closed position, as shown in solid lines, and when the plate 100 is in the door open position, as shown in dotted lines. Accordingly, the spring 106 maintains the plate 100 in one of two positions either against the stop pin 108 or against the stop pin 109. The plate is therefore toggle actuated to snap into and hold at one of two positions.

When the plate 100 is against the stop pin 108 and in the door closed position, a cam arm 110 engages and actuates the limit switch 111 which functions in the same manner as the limit switch 80 of the embodiment in FIGS. 1 and 2 in that it completes the traction interlock circuit and de-energizes the light circuit to indicate the door is in open position and also opening the traction interlock circuit. Similarly, when the door moves to closed position, the door pin 105 engages and strikes the arm 103 of the plate 100 to drive the plate to the door closed position and thereby actuate the limit switch 111. The spacing between the arms 102 and 103 constitutes the lost motion function between the door and the sensing device wherein once the door has been moved to closed position and has actuated the plate 100 to the door closed position, it can be forced toward open position a limited amount before causing actuation of the limit switch 111. The spacing between the arms 102 and 103 may vary depending upon the design of the system. Moreover, the positions of the arms 102 and 103 may be adjusted to provide the proper door monitoring function.

It should now be appreciated that should the primary driving linkage fail, the secondary linkage arrangement will not only prevent completion of the traction interlock circuit but also indicate that the door is not in closed position, thereby preventing movement of the train which would endanger the passengers. Accordingly, greater passenger safety is accomplished with the present invention.

It will be understood that modifications and variations may be effected without departing from the scope of the novel concepts of the present invention, but it is understood that this application is to be limited only by the scope of the appended claims.

The invention is hereby claimed as follows:

1. In a vehicle having a door opening in a side wall with inner and outer panels and a slidable door selectively movable between open and closed positions relative to the door opening, a door operator for driving said door between open and closed positions relative to said door opening, said door operator being mounted above the floor in the side wall between the inner and outer panels thereof and adjacent to the door opening, said door operator including an upstanding mounting plate, a reversible motor mounted on said plate with its axis of rotation extending substantially parallel thereto, a gear box mounted on the motor and in driving relation therewith, said gear box having an output shaft extending normal to the axis of the motor and substantially transverse the side wall, primary driving linkage means connecting said output shaft and door to drive same between open and closed positions including lever means extending from said output shaft, said lever means moving to overcenter position relative to the output shaft when the door is in closed position to lock the door against movement, a primary linkage extension arm having one end pivotally mounted to the mounting plate and pivotally connected to said lever means, a primary linkage connecting rod pivotally connected to the other end of the primary linkage extension arm and to the trailing edge of the door, means on the mounting plate coacting with the lever means to monitor the door position, and secondary linkage means connected between the mounting plate and door and driven by said door, said secondary linkage means including a secondary linkage extension arm pivotally mounted at one end to the mounting plate, a secondary linkage connecting rod pivotally connected to the other end of the secondary linkage extension arm and to the trailing edge of the door, means on the mounting plate coacting with the secondary linkage extension arm for monitoring the door position, said door position monitor means of the primary and secondary linkage means including switches having contacts in said circuit which open the circuit when the door is in open position and close the circuit as the door reaches closed position, and said contacts of said switches being connected in series, whereby both linkage means must monitor the door closed position before the traction interlock circuit is closed.

2. The door operator of claim 1, and manually operable means on said mounting plate coacting with said secondary linkage means to lock the door in closed position, close said traction interlock circuit and interrupt power to said motor.

3. The door operator of claim 1, wherein said extension arm of said primary driving linkage means includes means permitting limited collapse and pushback of the door in the closed or near closed position a predetermined distance.

4. The door operator of claim 1, wherein said secondary linkage means includes lost motion means to permit limited reverse movement of the door from the door closed position before operation of the monitor switch associated therewith.

5. The door operator of claim 4, wherein said lost motion means includes a switch cam pivotally carried on said mounting plate, means frictionally holding said cam against rotation and lost motion connection means between said cam and extension arm of said secondary linkage means.

6. The door operator of claim 1, which includes a signal circuit for receiving opening and closing signals, said signal circuit comprising a first line with a lock relay and a second line with contacts of the lock relay, whereby a signal must be impressed on both lines to cause the door operator to open the door.

7. In a vehicle having a door opening in a side wall with inner and outer panels and a slidable door selectively movable between open and closed positions relative to the door openings, a door operator for driving said door between open and closed positions relative to said door opening, said door operator including a reversible motor driving a gear box having an output shaft, primary driving linkage means connected between said output shaft and door to drive same between open and closed positions including linkage movable to overcenter locked position when the door is closed, first switch means actuated by said linkage for sensing the linkage in overcenter locked position having first interlock switch contacts in a traction motor interlock circuit, whereby the first interlock switch contacts are closed when the linkage is in overcenter locked position and open when the linkage is out of overcenter locked position, and secondary linkage means driven by said door independent of said primary driving linkage means and monitoring door position, said secondary linkage means including second switch means having second interlock switch contacts in said traction motor interlock circuit and means for actuating said second switch means, whereby the second switch contacts are closed when the door is in closed position and open when the door is out of closed position, the switch contacts of said primary and secondary linkage means being in series, wherein the primary driving linkage must be in overcenter locked position and the secondary linkage means must sense the door in closed position before the traction motor interlock circuit is completed.

8. The door operator of claim 7, wherein said switch actuating means of said secondary linkage means includes lost motion means permitting limited reverse movement of the door from the door closed position before actuating said switch contacts to open position, and to cause lag of the actuating means of said second switch means during the door closing cycle to maintain the second interlock switch contacts in open position until the door is in near full closed position.

9. The door operator of claim 7, wherein said first switch means of said primary driving linkage means includes signal circuit switch contacts in a signal light circuit for indicating when the linkage means is out of overcenter locked position, and said second switch means of said secondary linkage means includes signal circuit switch contacts in said signal light circuit indicating when the door is not in fully closed position.

10. The door operator of claim 7, wherein a motor control circuit is provided to control operating directions of the motor, said circuit including a thermal overload cutout to open the main power line in the event of overload, and an overload resistor bypassing said cutout to operate the motor at a safe, reduced current level in the event the cutout opens.

11. The door operator of claim 7, wherein a motor control circuit is provided to control operating directions of the motor, said circuit including switch means having normal, cutout and test positions for permitting normal operation of the operator when in said normal positions, for permitting the operator to be removed from service when in said cutout position, and to permit closing of an opened door when in the test position.

12. The door operator of claim 7, wherein a motor control circuit is provided to control operating directions of the motor, said circuit including a door open line for energizing a motor control relay to control operator direction, and a door lock line for energizing a lock relay having contacts in the door open line, whereby signals must be impressed on both lines to cause the operator to produce an opening cycle.

13. The door operator of claim 7, wherein means for locking the door in closed position coacts with said secondary linkage means and includes a mechanical lock pawl movable between lock and unlock positions and a door lock switch actuated by the pawl when in locked position to bypass the traction motor interlock circuit to permit continued operation of the car system less the functioning of the locked out operator.

14. The door operator of claim 7, wherein said means for actuating said second switch means includes lost motion means permitting limited reverse movement of the door from the door closed position before actuating said second switch contacts to open position.

15. The door operator of claim 14, wherein said means for actuating said second switch means further includes a U-shaped plate pivotally mounted on a shaft, a door pin on the trailing edge of the door coacting with the plate, spring means for snapping the plate to over-center position in both the door open and door closed positions, and a cam arm extending from said plate coacting with said second switch means.

16. The door operator of claim 14, wherein said means for actuating said second switch means further includes an extension arm pivotally mounted at one end on a shaft, a connecting rod pivotally connected to the other end of the extension arm and to the trailing edge of the door, and cam means connected to the extension arm for coacting with said second switch means.

* * * * *